US012573837B2

(12) United States Patent
Bugaut et al.

(10) Patent No.: US 12,573,837 B2
(45) Date of Patent: *Mar. 10, 2026

(54) ELECTRONIC SPATIAL SYSTEM

(71) Applicant: AIRBUS DEFENCE AND SPACE SAS, Toulouse cedex (FR)

(72) Inventors: Vincent Bugaut, Toulouse cedex (FR); Tony Chapelet, Toulouse cedex (FR); Quang duc Dam, Toulouse cedex (FR)

(73) Assignee: AIRBUS DEFENCE AND SPACE SAS, Toulouse (FR)

( * ) Notice: Subject to any disclaimer, the term of this patent is extended or adjusted under 35 U.S.C. 154(b) by 165 days.

This patent is subject to a terminal disclaimer.

(21) Appl. No.: 18/293,607

(22) PCT Filed: Jul. 19, 2022

(86) PCT No.: PCT/EP2022/070158
§ 371 (c)(1),
(2) Date: Jan. 30, 2024

(87) PCT Pub. No.: WO2023/006500
PCT Pub. Date: Feb. 2, 2023

(65) Prior Publication Data
US 2024/0348043 A1     Oct. 17, 2024

(30) Foreign Application Priority Data
Jul. 30, 2021     (FR) ...................................... 2108362

(51) Int. Cl.
H02H 7/12          (2006.01)
G01N 17/00          (2006.01)
(Continued)

(52) U.S. Cl.
CPC ........... H02H 7/1213 (2013.01); G01N 17/00 (2013.01); G06T 7/0002 (2013.01);
(Continued)

(58) Field of Classification Search
CPC .................. G01N 17/00; G06T 7/0002; G06T 2207/30148; H01L 23/62; H02H 1/0007;
(Continued)

(56) References Cited

U.S. PATENT DOCUMENTS

| | | | | |
|---|---|---|---|---|
| 7,310,211 B2 * | 12/2007 | Gruber | ................. | H10D 84/854 |
| | | | | 257/E27.063 |
| 7,489,136 B1 * | 2/2009 | Poland | ............... | G01R 31/2829 |
| | | | | 340/514 |
| 2017/0033554 A1 * | 2/2017 | Vail | .......................... | H02H 3/10 |

FOREIGN PATENT DOCUMENTS

| | | | | |
|---|---|---|---|---|
| EP | 3125389 A1 | 2/2017 | | |
| WO | WO-2021084073 A1 * | 5/2021 | ............. | G11C 29/50 |

OTHER PUBLICATIONS

Machine translation of Cibils International Patent Document WO 2021/084073 A1 May 2021 (Year: 2021).*

(Continued)

*Primary Examiner* — Kevin J Comber
(74) *Attorney, Agent, or Firm* — Nixon & Vanderhye, PC

(57)          ABSTRACT

An electronic spatial system is disclosed including an electronic circuit that is sensitive to spatial radiation, including at least one signal input port and/or at least one signal output port; a signal processing unit; an electronic spatial radiation detection unit electrically connected to the signal processing unit; and at least one protective switch electrically connected between the electrical ground of the electronic spatial system and at least one out of the signal input or signal output ports of the sensitive electronic circuit, and controlled by the signal processing unit. The signal processing unit is configured to switch the at least one protective switch to the electrical ground upon detecting an amplitude of a signal that is representative of an amount of spatial radiation greater than a predefined radiation threshold.

13 Claims, 7 Drawing Sheets

(51) Int. Cl.
*G06T 7/00* (2017.01)
*H02H 1/00* (2006.01)
*H02H 7/20* (2006.01)
(52) U.S. Cl.
CPC ............ *H02H 1/0007* (2013.01); *H02H 7/20* (2013.01); *G06T 2207/30148* (2013.01)
(58) Field of Classification Search
CPC ........ H02H 5/005; H02H 7/1213; H02H 7/20; H03K 17/082; H03K 2217/0027
USPC .......................................................... 361/78
See application file for complete search history.

(56) References Cited

OTHER PUBLICATIONS

International Search Report with English Translation for PCT/EP2022/070158, mailed Nov. 18, 2022, 6 pages.
Written Opinion of the ISA for PCT/EP2022/070158, mailed Nov. 18, 2022, 13 pages.
International Preliminary Report on Patentability for PCT/EP2022/070158, mailed Nov. 2, 2023, 18 pages.

* cited by examiner

100

ELECTRONIC SPATIAL SYSTEM

CROSS REFERENCE TO RELATED APPLICATIONS

The present application is a National Phase of International Application Number PCT/EP2022/070158 filed Jul. 19, 2022, which designated the U.S. and claims priority benefits from French Application Number FR 2108362 filed Jul. 30, 2021, the entire contents of each of which are hereby incorporated by reference.

TECHNICAL FIELD OF THE INVENTION

The present invention relates to an electronic spatial system configured to resist spatial radiations. More particularly, the invention relates to an electronic spatial system capable of detecting a singular event on an electronic circuit caused by spatial radiations and of reacting thereto accordingly.

PRIOR ART

Spatial systems, defined according to the Karman line as systems operating at more than one hundred kilometers of altitude, evolve in a radiative environment. This radiative environment is characterized in particular by the presence of two types of particles: protons and heavy ions. These charged particles cause effects so-called singular effects on the electronic components embedded within such systems.

The reduction of the electrical dimensions and parameters of the transistors of the electronic components embedded within spatial systems, makes these components more and more sensitive to spatial radiation type disturbances leading to singular events commonly known according to the Anglo-Saxon acronym SEE (Single Event Effects). These events are the consequence of a current pulse resulting from impact in sensitive zones of the integrated circuit, of energetic particles present in the environment in which they operate. Among the different types of singular events, mention may be made in particular of the latch-up singular event, so-called SEL according to the Anglo-Saxon acronym (Single Event Latch Up), which give rise to ground-power supply short-circuits and could therefore lead to the destruction of the integrated circuit by over-current, inducing a thermal effect or an electromigration;

the destruction singular event, commonly so-called SEB according to the Anglo-Sacon acronym (Single Event Burn-out), which could lead to the destruction of an electronic powers component following the thermal runaway resulting from the combination of triggering of a parasitic bipolar transistor of an electronic powers component and of triggering of the avalanche mechanism causing a multiplier effect of the electric current inside initially insulating materials of the power electronics component; the gate rupture singular event, commonly so-called SEGR according to the Anglo-Saxon acronym (Single Vent Gate Rupture), which could lead to the destruction of an insulated-gate field-effect component due to the breakdown of the gate oxide induced by the passage of one single particle such as a heavy ion, a proton or a neutron, or an event of disturbance by an isolated particle commonly so-called SEU according to the Anglo-Saxon acronym (Single event upset). This event of disturbance by an isolated particle is a change of state caused by one single ionizing particle striking a sensitive node in a microelectronic device, such as in a microprocessor, a semiconductor memory, or power transistors. The change of state is the result of the free charge created by ionization in or proximate to an important node of a logic element. The error of the output data caused by this impact is so-called perturbation by an isolated particle.

The singular effects result in a risk of damaging and even destroying electronic components embedded within such systems reducing the service life of the systems. The probability of this risk is related on the one hand to the intrinsic sensitivity of the component to protons and to heavy ions, and on the other hand to the use which is made of the component, in particular the supply voltage, the temperature, and in a non-generic manner the duration of use and the location in orbit during use, the use being herein defined as the period during which the component is electrically powered.

To this end, it is known to design electronic systems for spatial systems including at least one sensitive integrated circuit, the sensitive integrated circuit including a sensitivity to spatial radiation causing singular events, for example an integrated circuit of the microcontroller type or of the "programmable logic array" type commonly referred to according to the acronym FPGA (Field Programmable Gate Arrays) comprising an additional electronic circuit for monitoring the sensitive integrated circuit, or also so-called companion circuit of the sensitive integrated circuit. The companion circuit is capable of cutting off the power supply of the sensitive integrated circuit in case of detection of an SEE.

It is also known to be able to test existing solutions. A known solution consists in exposing an electronic component potentially sensitive to spatial radiations to a source of protons and a source of heavy ions in order to being able to confirm or deny the sensitivity of the electronic component, and therefore of the electronic components originating from the same manufacturing batch; characterizing, where appropriate, this sensitivity and establishing, where appropriate, a partial index of short-term reliability of the efficiency of the companion circuit by the absence of failures that could be caused by singular events in the functionalities of the component. Exposure to the aforementioned heavy ion source capable of exhaustively triggering a singular event, requires opening of the case of the electronic component being tested, or thinning the electronic chip on the flip-chip type components. More particularly, industrially, we will talk about exposure to a source of heavy ions with limited penetration, i.e. penetrating a few tens of micrometers in the silicon layers of the electronic chips. An example of an installation allowing generating these heavy ions with limited penetration is the heavy ion line of the Catholic University of Louvain (UCL) which penetrate into silicon only from 50 μm to 60 MeV·cm2/mg in Xe ion.

However, the suggested solutions do not allow avoiding the effects of singular events in a deterministic manner even if a specific device is integrated therein during design thereof. The suggested solutions also do not allow guaranteeing, in an efficient industrial manner, i.e. according to time, cost and risk constraints, the service life of the sensitive electronic component provided with a companion circuit and embedded within a spatial system. The reasons for this problem are due in particular to opening and thinning of the component reducing the capacity of the component to dissipate the heat produced during rated operation thereof and prevent use thereof in a representative manner. In addition, in the event of a negative conclusion of the service life test, one does not know how to distinguish the part of the failure due to opening of the case of the electronic component being tested, or to thinning of the electronic chip on flip-chip type components, and the part of failure due to a singular event caused by exposure to proton and heavy ion radiations.

DISCLOSURE OF THE INVENTION

The present invention aims to overcome these drawbacks with a completely novel approach.

To this end, according to a first aspect, the present invention relates to an electronic spatial system including: an electronic circuit sensitive to spatial radiations comprising at least one signal input port and/or at least one signal output port; a signal processing unit; an electronic unit for detecting spatial radiations electrically connected to the signal processing unit; at least one protective switch electrically connected between the electrical ground of the electronic spatial system and at least one out of the signal input or output ports of the sensitive electronic circuit, and controlled by the signal processing unit; at least one cut-off switch electrically arranged in parallel with the at least one protective switch, and controlled by the signal processing unit; the signal processing unit being configured to switch the at least one protective switch to the electrical ground upon detection of an amplitude of a signal representative of the amount of spatial radiations greater than a predefined radiation threshold, the signal processing unit being configured to switch the cut-off switch to the electrical ground when turning off the sensitive electronic circuit.

The invention is implemented according to the embodiments and the variants set out hereinafter, which are to be considered individually or according to any technically-feasible combination.

Advantageously, the electronic circuit sensitive to spatial radiations may comprise at least one signal output port, wherein at least one out of the protective switches is electrically connected to the signal output port. This device is advantageous for circuits including an output port such as power components, in particular regulation and stabilization devices, or clocks.

Advantageously, the electronic circuit sensitive to spatial radiations may comprise at least one signal input port and at least one signal output port, the system including: a first protective switch electrically connected between the electrical ground of the electronic spatial system and the signal input port; a second protective switch electrically connected between the electrical ground of the electronic spatial system and the signal output port.

Advantageously, the at least one cut-off switch may include a bipolar transistor configured to be switched from an OFF electrical state into an ON electrical state within a time period greater than one hundred microseconds, preferably greater than one millisecond.

Advantageously, the electronic unit for detecting spatial radiations may comprise an electronic device for monitoring the electric current of the signal input port. Advantageously, the electronic unit for detecting spatial radiations may comprise an electronic device for monitoring the electrical voltage of the signal output port.

Advantageously, the at least one protective switch may include a field-effect transistor or a Darlington pair of two bipolar transistors. The Darlington pair is interesting for low-consumption components.

Advantageously, the at least one protective switch is configured to be switched from an OFF electrical state into an ON electrical state within a time period less than one hundred microseconds, preferably less than ten microseconds.

Advantageously, the at least one signal input port may be an electric power supply rail of the sensitive electronic circuit.

According to a second aspect, the present invention relates to a method for protecting the sensitive electronic circuit of the above-described electronic spatial system, the protection method comprising the steps of: detecting an amplitude of the signal representative of the amount of spatial radiations greater than a predefined radiation threshold; and switching to the electrical ground at least one protective switch and at least one cut-off switch.

Advantageously, the electronic spatial system may include at least two protective switches so that the switching step of the protection method may comprise simultaneously switching to the electrical ground each of the at least two protective switches.

Advantageously, the protection method may comprise a step of cutting off the electric power supplies of the sensitive electronic circuit, preferably this cut-off step preceding the step of switching to the electrical ground the at least one protective switch.

According to a third aspect, the present invention relates to a test method ensuring a predefined service life of the above-described electronic spatial system, the test method including the steps on the ground of: sending penetrating heavy ions or penetrating radiation capable of creating latch-up on the sensitive electronic circuit; functional tests of the electronic spatial system following the step of sending penetrating heavy ions or penetrating radiation, for a pre-determined time period and under thermal stress representative of an accelerated ageing equivalent to the predefined service life of the electronic spatial system on-board a satellite in Earth orbit.

Advantageously, the test method may further comprise the steps on the ground of: acquiring the number of switching operations of at least one protective switch from the OFF state into the ON state during the sending step; comparing the acquired number of switching operations with a pre-defined number of switching operations to the electrical ground that is representative of an estimated number of switching operations to the electrical ground that could be triggered over the predefined service life of the electronic system in its spatial environment; if the acquired number of switching operations is less than the predefined number of switching operations, switching repeatedly and complementarily to the switching operation of the at least one protective switch during the step of sending penetrating heavy ions or penetrating radiation, up to a predefined number of switching operations to the electrical ground representative of an estimated number of switching operations to the electrical ground that could be triggered over the predefined service life of the electronic system in its spatial environment.

Preferably, this test method is carried out on a component that has not been deprived of its protective case or thinned in the case of a flip chip component (flip chip). In other words, the test is carried out in the intended hardware configuration on-board a satellite.

The invention is implemented according to the embodiments and the variants set out hereinafter, which are to be considered individually or according to any technically-feasible combination.

Advantageously, the test method may further comprise a step of determining the state of the structures of the sensitive electronic circuit by imaging the sensitive electronic circuit following the step of sending pulses of penetrating heavy ions or of penetrating radiation.

BRIEF DESCRIPTION OF THE FIGURES

Other advantages, aims and features of the present invention appear from the following description given, for explanatory and non-limiting purposes, with reference to the appended drawings, wherein.

DESCRIPTION OF THE EMBODIMENTS

Figure 1:
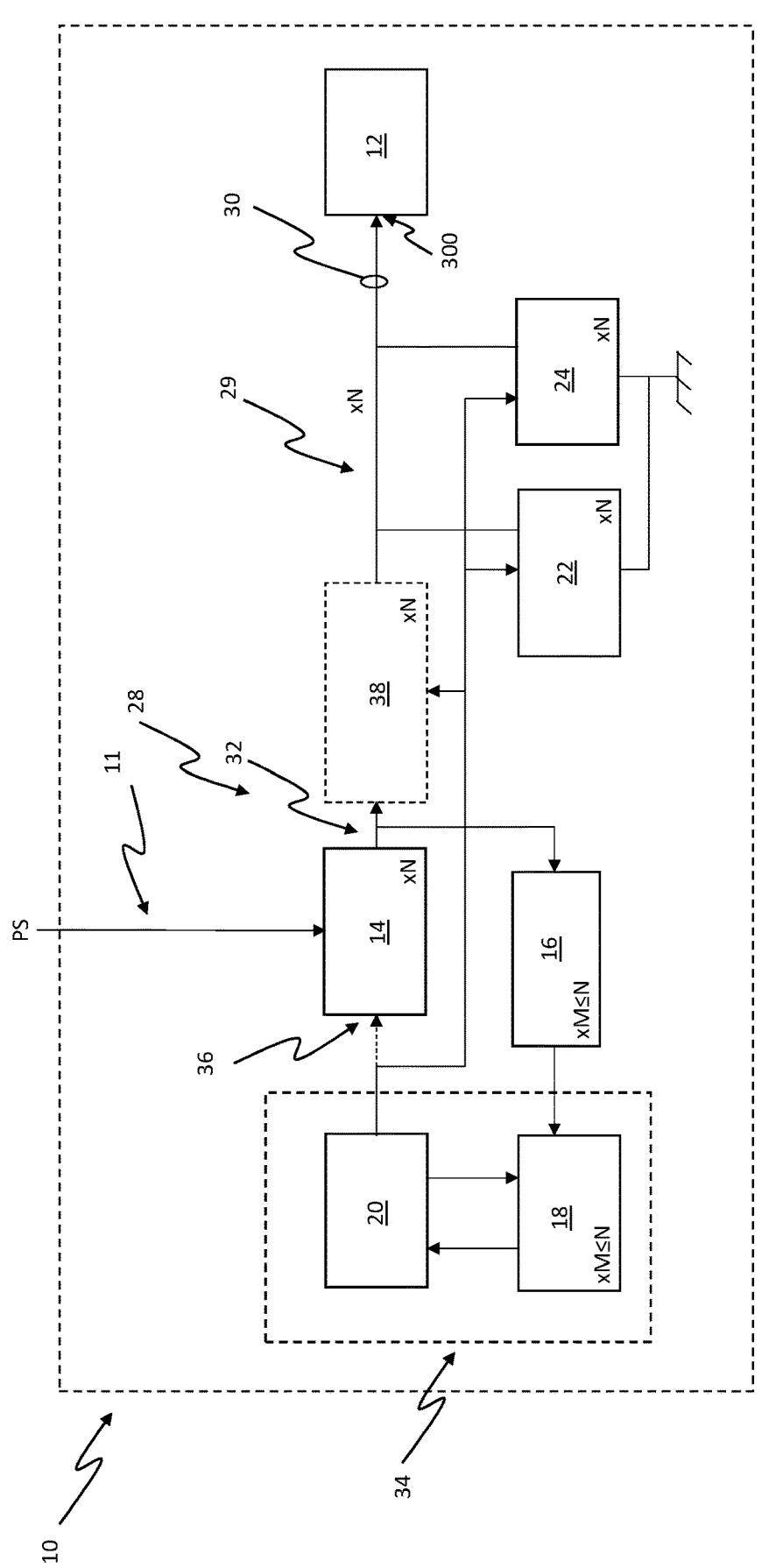
FIG. 1 is a schematic illustration of an electronic spatial system according to a first embodiment.

According to FIG. 1, a first embodiment of an electronic spatial system 10 including a sensitive electronic circuit 12, configured to be embedded in a satellite is shown. Because of its design, the sensitive electronic circuit 12 is intrinsically sensitive to bombardment with energetic particles present in the space. More particularly, the sensitive electronic circuit 12 is configured to be operational in a radiative environment characterized by the presence of protons and heavy ions that could generate singular events resulting in damage or destruction of the sensitive electronic circuit 12. More particularly, the damage of the sensitive electronic circuit 12 may cause a loss of reliability of the electronic system no longer allowing ensuring a service life of the electronic system 10 in accordance with the expectations, i.e. for example and in a non-limiting manner, a ten-year service life of the electronic system 10 on-board a satellite evolving in Earth orbit.

The sensitive electronic circuit 12 includes at least one signal input port 300 such as an electric power supply input, electrically connected to the power supply rail 30, configured to distribute an electric power supply to various electronic blocks of the sensitive electronic circuit 12. In general, the sensitive electronic circuit 12 may include a plurality of signal input ports. More particularly, the sensitive electronic circuit 12 may include N power supply rails 30, which could be of different levels of DC voltage or of DC electric current, each power supply rail 30 distributing an electric power supply to a particular electronic block of the sensitive electronic circuit 12. For example and in a non-limiting manner, a first power supply rail 30 may distribute an electric power supply to a digital calculation block of the sensitive electronic circuit 12, a second power supply rail may distribute an electric power supply to a memory block of the sensitive electronic circuit 12, a third power supply rail could distribute an electric power supply to an analog block of the sensitive electronic circuit 12. In a non-limiting manner, the sensitive electronic circuit 12 may be a microcontroller, a programmable logic array type circuit, or an application-specific integrated circuit commonly so-called ASIC.

According to FIG. 1, the electronic spatial system 10 includes a main power supply input PS configured to supply an electric power supply 11 to an electric power supply regulation and stabilization device 14. The electric power supply regulation and stabilization device 14 comprises a regulated power supply output 32 configured to supply an electrical power supply signal 29 preferably to at least one power supply rail 30 of the sensitive electronic circuit 12. In a particular and non-limiting manner, the electric power supply regulation and stabilization device 14 may comprise either a low-dropout regulator, commonly referred to as LDO regulator, allowing regulating the output voltage of the regulator even when the supply voltage of the regulator is very close to the output voltage, or a DC/DC type converter.

According to FIG. 1, the electronic spatial system 10 includes an electronic unit for detecting spatial radiations. For example, the electronic unit for detecting spatial radiations may be a radiation sensor detecting directly the amount of spatial radiations at the electronic spatial system 10 or still more particularly, an electronic device for monitoring the electrical power supply signal 29, the electrical power supply signal could be altered by a singular event on the sensitive electronic circuit 12 following exposure of the electronic spatial system 10 in a highly radiative spatial environment. The alteration of the electrical power supply signal enables an indirect detection of the amount of spatial radiations at the electronic spatial system 10. To this end, the electronic device for monitoring the electrical power supply signal 29 is an electronic device for monitoring the instantaneous electric current 16 outputted by the regulation and stabilization device 14 and consumed on the at least one power supply rail 30 of the sensitive electronic circuit 12 electrically connected to the regulated power supply output 32. The electronic device for monitoring the electric current 16 may comprise different means of current sensors such as Hall-effect current sensors or differential measurement sensors for measuring the current consumed by the at least one power supply rail 30.

According to FIG. 1, the electronic spatial system 10 includes a signal processing unit 34 comprising means for analyzing electrical signals originating from different sensors of the electronic spatial system 10, and protection functions control means 20 of the sensitive electronic circuit 12 electrically connected to the means for analyzing electrical signals originating from different sensors of the electronic system 10. The protection functions control means 20 of the sensitive electronic circuit 12 may comprise, for example and in a non-limiting manner, an FPGA-type digital processing unit or any other logic-type digital electronic circuit allowing processing information and outputting command signals.

The electrical signal analysis means of the signal processing unit 34 are configured to compare an amplitude of a signal representative of the amount of spatial radiations detected directly or indirectly by the spatial radiation detection electronic unit with a predefined first radiation threshold. More particularly, the electrical signal analysis means of the signal processing unit 34 comprise at least one current comparison device 18 electrically connected to the electronic device for monitoring the instantaneous electric current 16 and configured to compare the amplitude of the current measured by the electronic device for monitoring the instantaneous electric current 16 with a predefined current threshold. The predefined current threshold may be adjusted by the protection function control means 20 of the sensitive electronic circuit 12. In particular, the current comparison device 18 comprises an analog comparator whose processing time is in the range of a few microseconds and possibly one microsecond which could include an input low-pass filter of the RC filter type with a time constant in the range of one tenth of a microsecond, and possibly one microsecond and an output low-pass filter of the RC filter type with a time constant in the range of one hundredth of a microsecond, and possibly one hundredth of a microsecond.

The protection function control means 20 of the sensitive electronic circuit 12 are configured to control electronic devices for protecting the sensitive electronic circuit 12 in particular according to the result of the comparison of the amplitude of the signal representative of an amount of radiation detected by the spatial radiation detection electronic unit with the predefined first radiation threshold. More particularly, according to FIG. 1, the protection functions control means 20 of the sensitive electronic circuit 12 are configured to control electronic devices for protecting the sensitive electronic circuit 12 in particular according to the result of the comparison of the amplitude of the current measured by the electronic device for monitoring the instantaneous electric current 16 with the predefined current threshold.

To this end, according to FIG. 1, the electronic spatial system 10 includes a first protective switch 24 of the sensitive electronic circuit 12 controlled by the protection function control means 20. The first protective switch 24 is arranged between the power supply rail 30 of the protection sensitive electronic circuit 12 and the electrical ground of the electronic spatial system 10. The first protective switch 24 is configured to be switched from an open state, also so-called OFF state not enabling an electric current to flow between its terminals, into a closed state, also so-called ON state letting an electric current flow between its terminals. This switching and the electrical discharge of the signal input port 300 of the sensitive electronic circuit 12 following this switching are carried out within a time period less than one hundred microseconds, and preferably within a time period less than ten or twenty microseconds. Such a high switching speed is interesting for example for carrying out tests on the ground based on X-rays, as described hereinbelow with reference to FIG. 7, which could generate a significant thermal stress on the component being tested with a risk of destruction. In flight as well as in case of a heavy ion-based ground testing, the thermal stress is lower, but a fast switching is also useful. To this end, the first protective switch 24 is so-called first protection raw switch, with reference to the electrical cut-off brutality of said switch. To this end, and in a non-limiting manner, the first protective switch 24 may be a transistor so-called power field-effect transistor configured to be able to be switched by the protection function control means 20 of the sensitive electronic circuit 12 according to a switching time between an OFF state into an ON state of less than one hundred microseconds, preferably less than ten or twenty microseconds. Alternatively, the first protective switch 24 may be implemented in the form of two bipolar transistors configured according to a Darlington pair. Indeed, the N-type field-effect transistors can be easily controlled because they require a positive gate voltage in order to become ON. However, the N-type field-effect transistors do not hold high cumulative doses of radiations, or TID (standing for "Total Ionizing Dose" in the Anglo-Saxon literature) and are thus easily destroyed with regards to the application that is intended herein. Conversely, the P-type field-effect transistors are more resistant to strong TIDs. However, the control of the P-type field-effect transistors is more complicated as it requires generating negative gate voltages in order to become ON. Thus, the use of bipolar transistors mounted in Darlington pairs allows obtaining a protective switch which, on the one hand, holds over time despite high TIDs and, on the other hand, does not have an increased control complexity.

The closure of the first protective switch 24 allows discharging in less than one hundred microseconds, preferably less than ten or twenty microseconds, the electric current powering the sensitive electronic circuit 12 so as to cut off the power supply of a particular electronic unit of the sensitive electronic circuit 12 connected to the power supply rail 30. For reasons related to discharge efficiency of the power supply rail 30 of the sensitive electronic circuit 12, the first protective switch 24 should be preferably arranged the closest to the input pin of the power supply rail 30 of the sensitive electronic circuit 12. In a functional manner, the first protective switch 24 is configured to be switched into an ON state upon detection of an amplitude of the level of the signal representative of the amount of spatial radiations greater than the predefined radiation threshold, during a current overconsumption on a power supply rail 30 by the electronic device for monitoring the instantaneous electric current 16 associated with the current comparison device 18, said current overconsumption could be the consequence of a singular event caused by spatial radiations.

According to FIG. 1, the electronic spatial system 10 includes a cut-off switch 22 of the sensitive electronic circuit 12 controlled by the protection function control means 20. The cut-off switch 22 is arranged in parallel with the first protective switch 24. The cut-off switch 22 is configured to be switched from an open state, into a closed state, within a time period greater than one hundred microseconds, preferably greater than one millisecond or in the range of one millisecond. To this end, the cut-off switch 22 is so-called soft cut-off switch in contrast with the raw protective switch. To this end, and in a non-limiting manner, the cut-off switch 22 may be a common switching transistor of the bipolar transistor type configured to be able to be switched by the protection function control means 20 of the sensitive electronic circuit 12 according to a time of switching between an OFF state and an OFF state greater than one hundred microseconds, preferably greater than one millisecond or in the range of one millisecond. Closure of the cut-off switch 22 allows discharging, in about one millisecond, the electric current powering the sensitive electronic circuit 12 so as to cut off the power supply of a particular electronic block of the sensitive electronic circuit 12 connected to the power supply rail 30. In general, the cut-off switch 22 is configured to be switched into an ON state upon a request to turn off the sensitive electronic circuit 12 by the signal processing unit 34 depending on the need, or not, to activate the sensitive electronic circuit 12 with regards to the profile of the mission of the satellite. One of the advantages of the arrangement of the cut-off switch 22 is to be able to turn off the sensitive electronic circuit without generating any electrical stress on the signal input port 300 of the sensitive electronic circuit. To this end, the cut-off switch 22 could be not necessary if the signal input port 300 protected by the first protective switch 24 of the sensitive electronic circuit 12 does not have any counter-indications to the raw switching operations, i.e. to switching to the electrical ground carried out within a time period less than one hundred microseconds, preferably less than ten or twenty microseconds.

In particular, the cut-off switch 22 may also be switched into an ON state upon detection of lower spatial radiation that could cause a singular event of the micro-latch-up type, commonly so-called according to the Anglo-Saxon term micro-latch-up. More particularly, the cut-off switch 22 may also be switched into an ON state upon detection of a current overconsumption on a power supply rail 30 by the electronic device for monitoring the instantaneous electric current 16 associated with the current comparison device 18 which could be the consequence of a singular event when this overconsumption is comprised between a first predefined current threshold representative, for example, of a singular event of the micro-latch-up type, and a second predefined current threshold representative, for example, of a singular event of the latch-up type, on the other hand, if the current overconsumption is higher than the second predefined current threshold, the first protective switch 24 switches into the ON state.

According to FIG. 1, the electronic spatial system 10 also includes a means 28 for cutting off the power supply delivered to the power supply rail 30 of the sensitive electronic circuit 12. To this end, according to FIG. 1, two options relating to cut-off of the electric power supply delivered to the power supply rail 30 are depicted again.

A first solution of a means 28 for cutting off the power supply delivered to the power supply rail 30 of the sensitive electronic circuit 12 consists in using a regulation and stabilization device 14 including an ON/OFF type input 36 configured to be driven by the protection function control means 20. More particularly, according to the first solution, the protection function control means 20 are configured on the one hand to activate the regulation and stabilization device 14 by controlling the ON/OFF type input 36 in the ON position so as to enable the output of a stabilized and regulated power supply to the power supply rail 30, and on the other hand to deactivate the regulation and stabilization device 14 by controlling the ON/OFF type input 36 in the OFF position so as to cut off the stabilized power supply delivered to the power supply rail 30. This solution could be satisfactory provided that the reaction time of the cut-off of the power supply of the power supply rail 30 related to the deactivation of the regulation and stabilization device 14 is compatible with the desired effect, in particular the protection of the sensitive electronic circuit 12.

To this end, in order to overcome any design constraints of the regulation and stabilization device 14, a second solution of a means 28 for cutting off the electric power supply delivered to the power supply rail 30 of the sensitive electronic circuit 12 consists in arranging a cut-off switch 38 controlled by the protection function control means 20 and enabling cut-off of the electric power supply delivered to the power supply rail 30. Said cut-off switch 38 is arranged in series on the electric power supply delivered to the power supply rail 30 of the sensitive electronic circuit 12.

According to the invention, the electronic spatial system 10 may preferably comprise for the power supply of each of the N power supply rails 30 of the sensitive electronic circuit 12, a first protective switch 24 and a cut-off switch 22, as well as an electric power supply regulation and stabilization device 14 associated, or not, according to the selected solution, with a third switch so-called cut-off switch 38, as described in FIG. 1. Preferably, the electronic spatial system 10 may also comprise for the power supply of each of the N power supply rails of the sensitive electronic device 12 or common to several power supply rails 30 an electronic device for monitoring the instantaneous electric current 16 and a current comparison device 18 as described in FIG. 1.

Figure 2:
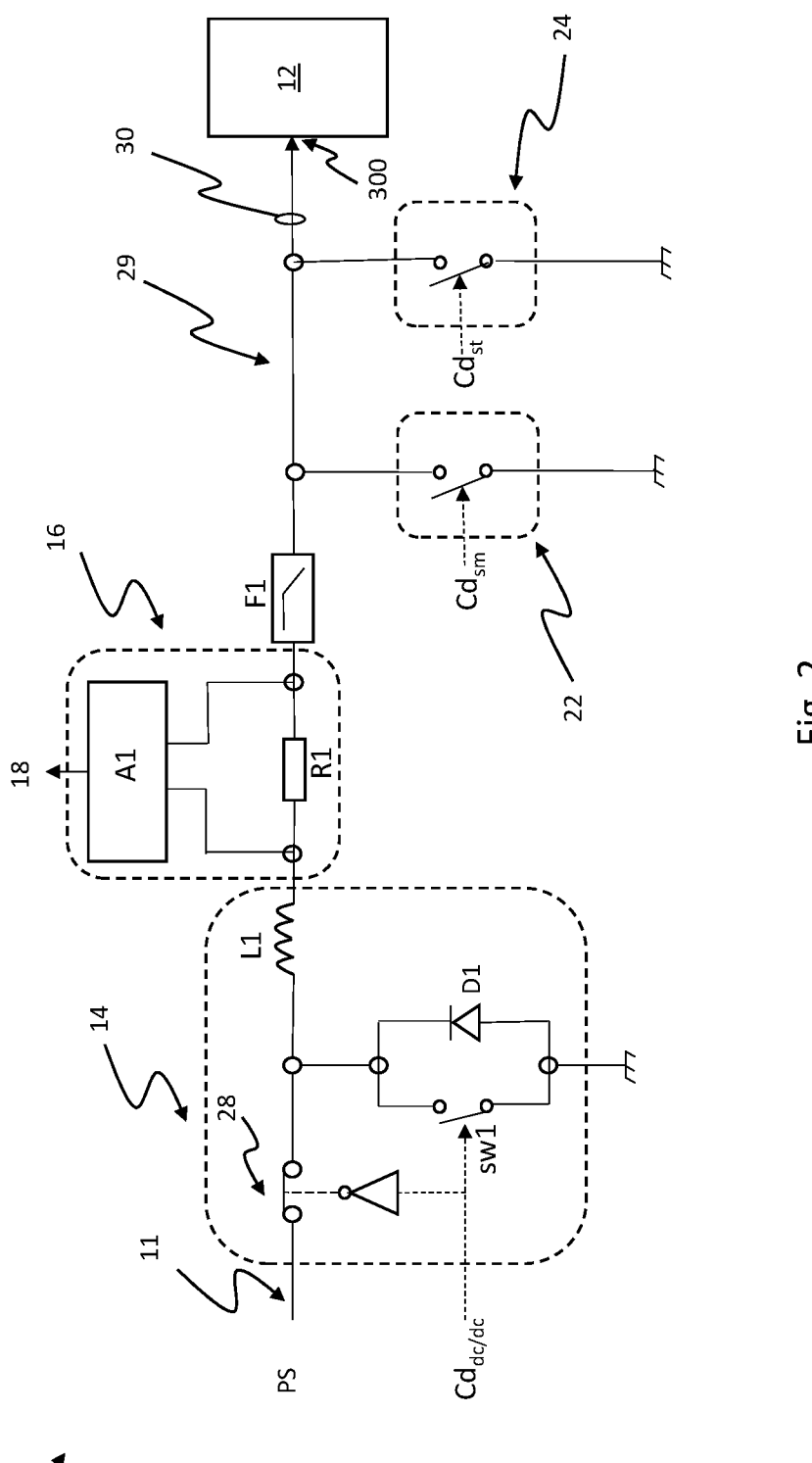
FIG. 2 is a detailed schematic illustration of an analog portion of the electronic spatial system according to a first embodiment.

According to FIG. 2, a non-limiting example of a first embodiment of the analog electronics of the electronic spatial system 10 of FIG. 1 is depicted again. To this end, the signal processing unit 34 is not shown in FIG. 2. As a non-limiting example, the electric power supply regulation and stabilization device 14 comprises a common synchronous step-down type DC/DC converter therefore including a series switch with the main power supply input PS and a chopping switch SW1 including a diode D1 in parallel and controlled by a chopping control signal $Cd_{dc/dc}$ from the signal processing unit 34, the chopping control signal $Cd_{dc/dc}$ being inverted to drive the series switch of the main power supply input PS. It should be noted that the series switch of the main power supply input PS is a means 28 for cutting off the electric power supply delivered to the power supply rail 30 of the sensitive electronic circuit 12 which could therefore be controlled from the signal processing unit 34. The voltage step-down converter further comprises an inductive element L 1 allowing forming an 'LC'-type filter with the load.

According to FIG. 2, the electronic device for monitoring the electric current 16 comprises a current sensor including a resistor R1 in series between the output of the electric power supply regulation and stabilization device 14 and the at least one power supply rail 30 of the sensitive electronic circuit 12, and an analog differential amplifier A1, connected to the terminals of the series resistor R1, whose processing time is in the range of a few microseconds, and possibly one microsecond. Preferably, the series resistance R1 is in the range of a few tens of milliohms, and possibly ten milliohms, the differential amplifier A1 being an amplifier designed based on bipolar transistors, and provided with a low-pass RC filter at the output with a time constant in the range of the tenth of a microsecond. In order to limit the undulations due to chopping of the voltage step-down converter, a low-pass filter F1 is arranged in series with the power supply of the power supply rail 30 of the sensitive electronic circuit 12.

According to FIG. 2 and in accordance with FIG. 1, the first protective switch 24, so-called first protection raw switch, is arranged between the supply rail 30 of the sensitive electronic circuit 12 and the electrical ground of the electronic spatial system 10. The first protective switch 24 is controlled by the signal processing unit 34 according to an open or close control signal $Cd_{st}$ according to the detection or not of an instantaneous electric current higher than the predefined current threshold; this overconsumption may be the consequence of a singular event. For example and in a non-limiting manner, in order to withstand the constraint of switching into a closed state within a time period in the range of ten microseconds, the raw protective switch may comprise a P-channel type power field-effect transistor having a low conduction impedance and a high transconductance. In a functional manner, the first protective switch 24 is by default configured in the OFF mode, i.e. open, so as not to ground the power supply rail 30 of the circuit of the sensitive electronic circuit 12.

The first protective switch 24 may be switched into the ON mode, i.e. closed, when a singular event, for example of the latch-up or SEL type, causes an electric current overconsumption detected on the power supply rail 30. To this end, the signal processing unit 34 firstly controls the cut-off of the electric power supply delivered to the power supply rail 30 by opening in less than a few microseconds the cut-off means 28 or cut-off switch of the DC/DC converter and then almost simultaneously with the cut-off of the supply of the rail 30, closing the first protective switch 24 within a time period in the range of ten microseconds so as to discharge, in an ultra-fast manner, the power supply energy of the electronic blocks of the sensitive electronic circuit 12 powered by the power supply rail 30. This ultra-fast electrical grounding of the power supply rail allows protecting the sensitive electronic circuit 12 from a destruction which could, for example and in a non-limiting manner, be caused by a thermal effect (or electromigration) subsequent to a singular event causing an excessive over-consumption of the electric current detected by the elec-tronic device for monitoring the electric current 16. This ultra-fast grounding could generate an electrical stress on the sensitive electronic circuit 12, so that a limited number of switching operations to the ground of the first protective switch 24 is to be provided for in this stress case in order to be able to guarantee a service life of the sensitive electronic circuit with regards to spatial requirements.

To this end and according to FIG. 2, the cut-off switch 22, so-called a soft cut-off switch, is arranged electrically in parallel with the first protective switch 24. The cut-off switch 22 is controlled by the signal processing unit 34 according to an open or close control signal Cd$_{sm}$ according to the need or not to cut off the sensitive electronic circuit 12. For example, and in a non-limiting manner, the cut-off of the sensitive electronic circuit 12 may be controlled by the signal processing unit 34 when the latter does not need to be operational. A switching operation in the range of one millisecond after cut-off of the electric power supply deliv-ered to the power supply rail 30 by opening of the switching means 28 of the DC/DC converter does not generate any electrical stress on the sensitive electronic circuit 12 and can therefore be repeated many times. As a non-limiting example, the cut-off switch 22 may comprise an NPN-type bipolar transistor, controllable in a conventional manner and enabling the conduction of a low current in comparison with the power MOS transistor. In particular, electrically ground-ing the power supply rail 30 by the cut-off switch 22 may be controlled by the protection function control means 20 in order to protect the sensitive electronic circuit 12 from a degradation subsequent to a singular event generating a lower electric current overconsumption measured by the electronic device for monitoring the electric current 16.

In general, it should be noted that the step-down DC/DC converter of FIG. 2 may also be a step-up type DC/DC converter, this choice depending on the voltage to be deliv-ered to the power supply rail 30 of the sensitive electronic circuit 12.

Figure 3:
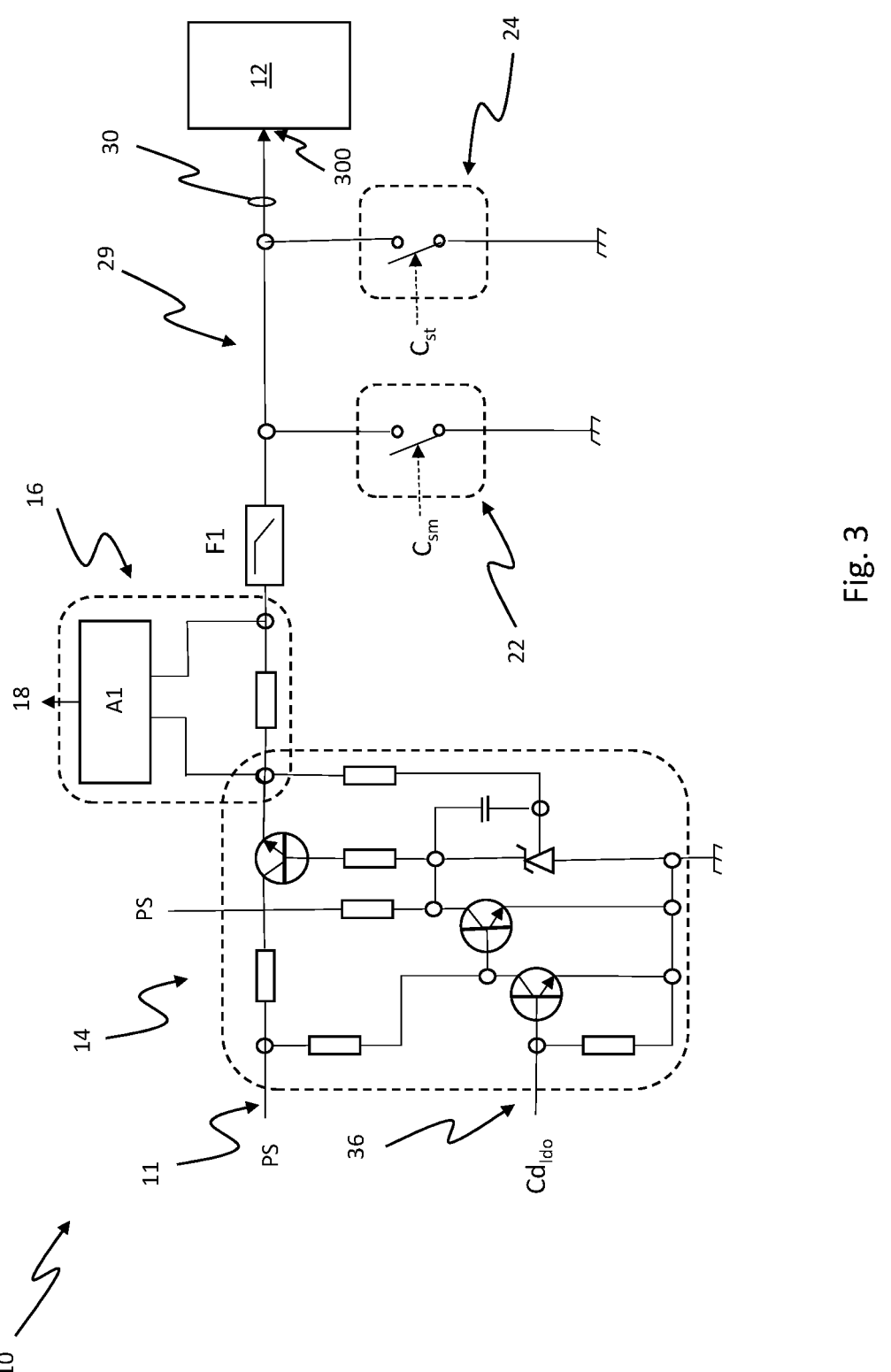
FIG. 3 is a detailed schematic illustration of an analog portion of the electronic spatial system according to a second embodiment.

According to FIG. 3, a non-limiting example of a second embodiment of the analog electronics of the electronic spatial system 10 of FIG. 1 is shown. The second embodi-ment of FIG. 3 differs from the first embodiment shown in FIG. 2 only in that the electric power supply regulation and stabilization device 14 is made in the form of a low-dropout regulator or LDO. The regulation and stabilization device 14 of this second embodiment comprises an analog structure with multiple bipolar transistors and also an on/off type input 36 driven by an on/off control signal Cd$_{ldo}$ originating from the protection function control means 20 of the sensi-tive electronic circuit 12 of the signal processing unit 34.

Figure 4:
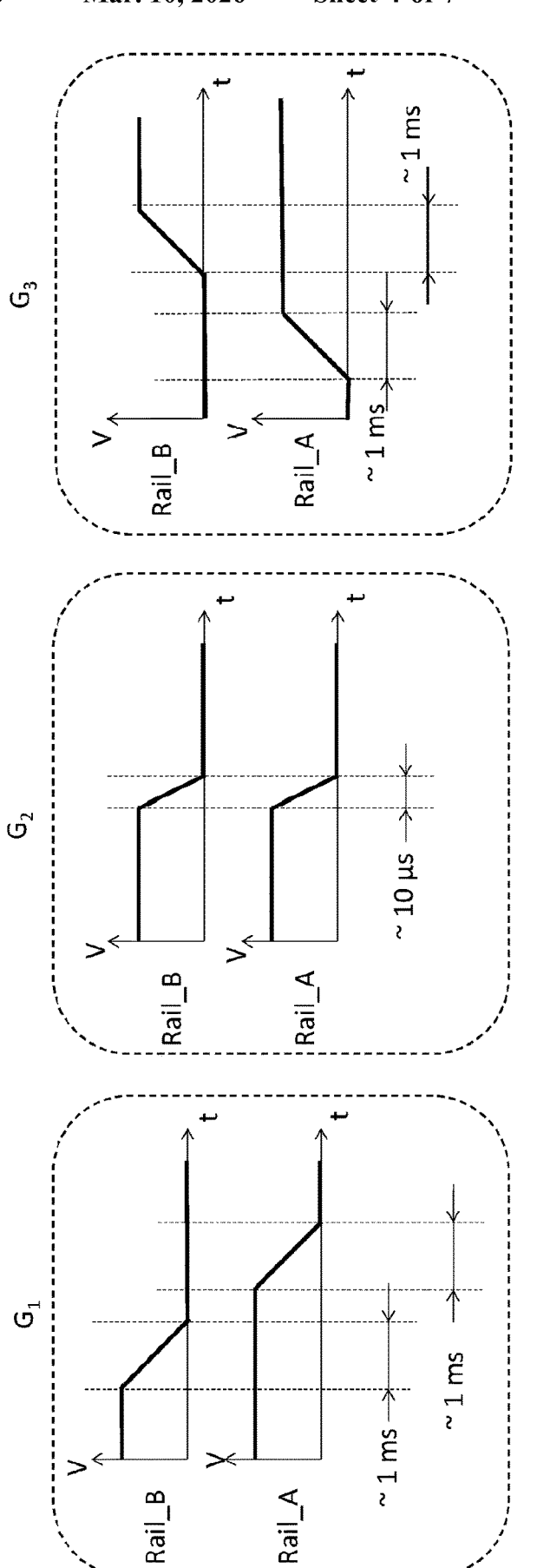
FIG. 4 is a schematic illustration of timing diagrams of switching operations of the switches of the electronic spatial system of FIG. 1.

According to FIG. 4, two groups G1, G2 of two timing diagrams relating to the electrical ground of two signal input ports of the sensitive electronic circuit are shown. More particularly, a sequence of electrically grounding a first power supply rail Rail_A of the sensitive electronic circuit 12, and a command to electrically ground a second power supply rail Rail_B of the sensitive electronic circuit 12 are shown. According to FIG. 4, the first group G1 shows the sequencing of electrically grounding the first power supply rail Rail_A and of the second power supply rail Rail_B upon a command of closure of a first cut-off switch 22 arranged between the first power supply rail 30 Rail_A of the sensitive electronic circuit 12 and the electrical ground of the elec-tronic spatial system 10, and upon a command of closure of a second cut-off switch, distinct from the first cut-off switch 22 arranged between the second power supply rail 30 Rail_B of the sensitive electronic circuit 12 and the electrical ground of the electronic spatial system 10. According to the first group G1 of timing diagrams, closure of the first cut-off switch 22 related to the first power supply rail 30 Rail_A is performed sequentially after closure of the second cut-off switch 22 related to the second power supply rail 30 Rail_B. According to the first group G1 of timing diagrams, the switching time from the open state into the closed state of each of the two cut-off switches 22 is in the range of one millisecond. This sequencing enables cut-off of two power supply rails Rail_A, Rail_B without causing any electrical stress on the sensitive electronic circuit 12. In general, a soft electrical grounding, i.e. a switching operation from the open state into the closed state of the cut-off switches 22 within a time period in the range of one millisecond for each of the power supply rails of the sensitive electronic circuit 12, associated, where necessary, with a sequencing of elec-trical grounding of the power supply rails according to their initial voltage level, allows cutting off all of the power supplies of a sensitive electronic circuit without causing any electrical stresses that could damage the internal structures of the sensitive electronic circuit 12. According to the invention, a soft electrical grounding allows cutting off all of the power supplies of a sensitive electronic circuit 12 so as to avoid degradation related to a singular event producing a low current overconsumption of the sensitive electronic circuit 12.

According to FIG. 4, the second group G2 represents a sequence of closure of a first protective switch 24 arranged electrically in parallel with the first cut-off switch 22, and of closure of a second protective switch, distinct from the first protective switch 24 arranged electrically in parallel with the second cut-off switch. According to the second group G2 of timing diagrams, closure of the first protective switch 24 related to the first power supply rail 30 Rail_A is performed simultaneously with closure of the second protective switch related to the second power supply rail 30 Rail_B. Accord-ing to the second group G2 of timing diagrams, the switch-ing time from the open state into the closed state of each of the two protective switches 24 is in the range of ten microseconds. This simultaneous closure of the two protec-tive switches 24 according to a switching time from the open state at the end of the discharge in the range of ten micro-seconds enables an immediate protection of the sensitive electronic circuit 12 so as to avoid a degradation of the sensitive electronic circuit 12 following a singular event causing a high overconsumption of the electric current of the sensitive electronic circuit 12. In general, a raw cut-off, i.e. a cutoff in the range of ten microseconds of each of the power supply rails 30 of the sensitive electronic circuit 12, associated with an almost simultaneous grounding of the power supply rails, allows cutting of all of the power supplies of a sensitive electronic circuit 12 so as to avoid destruction related to a singular event. According to the invention, the number of switching operations of the pro-tective switches 24 to the electrical ground of the electronic spatial system 10 should be limited so that the accumulation of electrical stress induced on the sensitive electronic circuit at each switching cannot generate a reduction in the service life of the sensitive electronic circuit 12 with regards to spatial requirements. It should be noted that an almost simultaneous grounding, i.e. sequentially, may be considered, if grounding of all of the signal input ports, in this case, all of the power supply rails, are switched within a cumulative time period in the range of about ten microseconds.

According to FIG. 4, a third timing diagram G3 representative of the re-establishment of the power supply of the first power supply rail Rail_A and of the second power supply rail Rail_B of the sensitive electronic circuit 12 is shown. To this end, opening of the protective switches 24 by the signal processing unit 34 is followed by a sequential closure of the cut-off means 28, 38 of the power supply, i.e. by the cut-off switches 38 of each of the power supply rails Rail_A, Rail_B. This functionality enables an automatic reset of the electronic spatial system 10 after switching in closure of the protective switches 24 of the sensitive electronic circuit 10, again enabling the optimum operation of the electronic spatial system 10. Equivalently, opening and closure of the cut-off switches 22 may be performed in a similar manner to that described for the protective switches 24.

Figure 5:
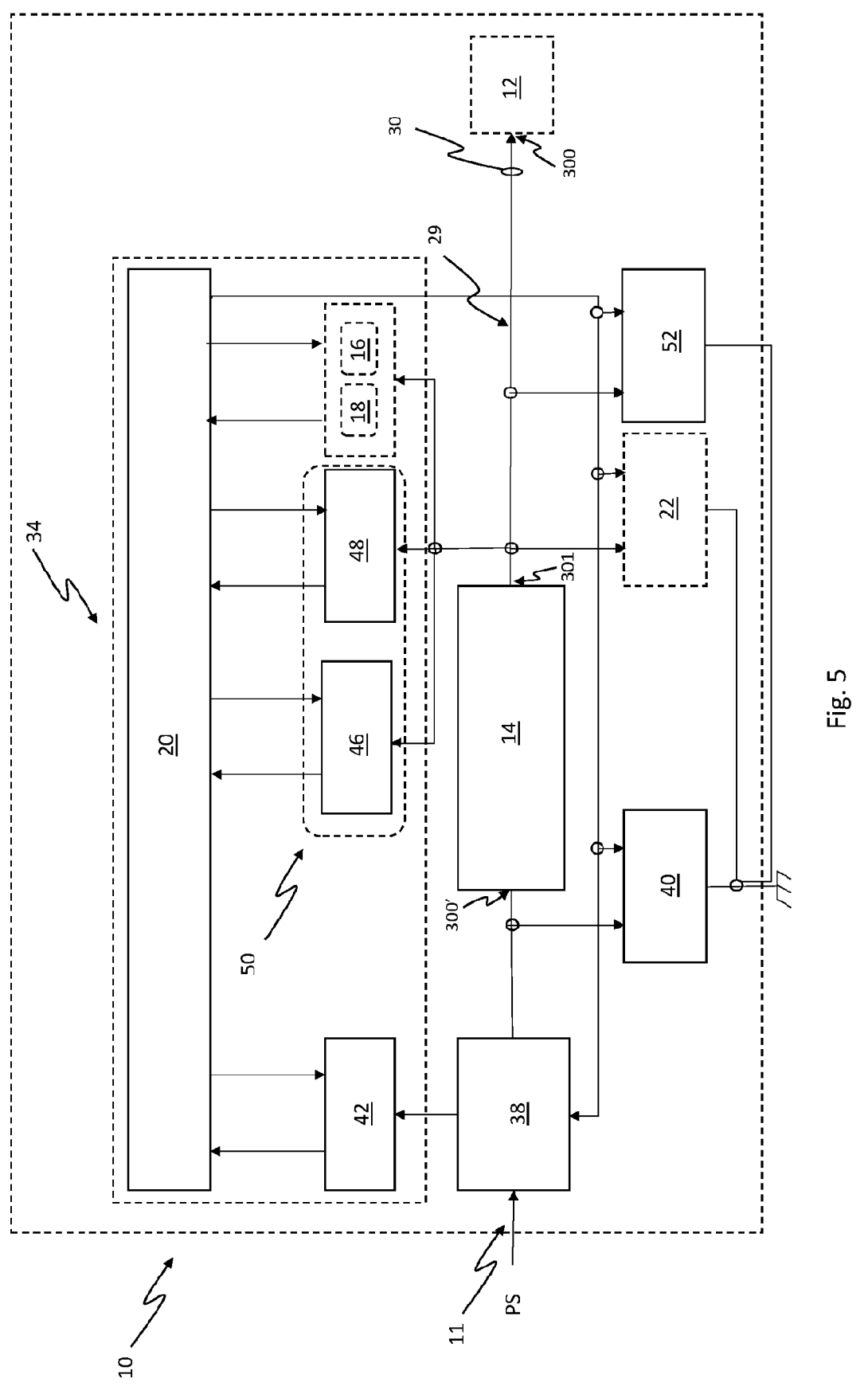
FIG. 5 is a schematic illustration of an electronic spatial system according to a second embodiment.

According to FIG. 5, a second embodiment of the electronic spatial system 10 is shown. This second embodiment allows protecting another sensitive electronic circuit of the electronic spatial system against space radiations that could generate singular events on this other sensitive electronic circuit. More specifically, this second embodiment allows protecting the other sensitive electronic circuit of the electronic spatial system including at least one signal input port 300 and/or one signal output port, the other sensitive electronic circuit could be damaged by a singular event.

Indeed, it is not excluded for example that the electric power supply regulation and stabilization device 14 of FIG. 5 is an electronic circuit also sensitive to spatial radiations causing singular events, whether of the so-called SEL latch-up type which could cause the degradation or destruction of the electric power supply regulation and stabilization device 14 by thermal effect. In the assumption of another sensitive electronic component including a signal output port 301, like for example according to FIG. 5 an electric power supply regulation and stabilization device 14 including in particular a digital portion for configuring the voltage or the current delivered by the signal output port, a disturbing singular event so-called SEU (Single event upset) could cause the alteration of a configuration register of the output signal which could cause damage to the component electrically powered by the regulation and stabilization device 14, in this case, according to FIG. 5, said sensitive electronic circuit 2 of FIG. 1.

According to FIG. 5, although illustrated, the sensitive electronic circuit 2 and its cut-off switch 22, as well as the electronic device for monitoring the instantaneous electric current 16 and the current comparison device 18 allowing supervising the electric current consumed by the sensitive electronic circuit 2 are not part of the electronic elements enabling the protection of the electric power supply regulation and stabilization device 14 from singular events. According to FIG. 5, and similarly to FIG. 1, the electronic spatial system 10 includes the signal processing unit 34 comprising means for analyzing electrical signals originating from different sensors of the electronic spatial system 10, and protection function control means 20 electrically connected to the means for analyzing electrical signals originating from different sensors of the electronic spatial system 10.

According to FIG. 5 and similarly to the protection of the sensitive electronic circuit 12, the electronic unit for detecting spatial radiations includes another device for monitoring the electric current 42 arranged to enable monitoring of the current consumed by the signal input port 300', i.e. the electric power supply input, of the electric power supply regulation and stabilization device 14. The protection function control means 20 of the signal processing unit 34 are configured to switch from an open state into an ON state a second protective switch 40 of the same type as the first protective switch 24, the second protective switch 40 being arranged between the signal input port 300' of the electric power supply regulation and stabilization device 14 and the electrical ground of the electronic spatial system 10.

According to FIG. 5, the electronic unit for detecting spatial radiations includes another electronic device for monitoring the electrical power supply signal 29. According to FIG. 5, the other electronic device for monitoring the electrical power supply signal 29 is an electronic voltage monitoring device 50 configured to detect the over-voltages as well as the sub-voltages on the regulated power supply output 32 of the electric power supply regulation and stabilization device 14. Advantageously, and in order to optimize the reaction time of the voltage monitoring device 50, the latter may include, for example and in a non-limiting manner, an analog operational voltage amplifier whose processing time is in the range of one microsecond enabling capture and measurement of the regulated output power supply voltage 32, i.e. as present on the signal output port 301, of the electric power supply regulation and stabilization device 14. The analog voltage amplifier is configured to output an image signal of the regulated output supply voltage 32 to a first analog comparator 46 whose processing time is in the range of one microsecond and configured to compare the measured voltage with a first minimum voltage threshold below which the signal processing unit 34 estimates that it consists of a sub-voltage which could be the consequence of a singular event, in particular of the disturbance event type or SEU. In a comparable manner, the analog voltage amplifier is configured to output the image signal of the regulated output supply voltage 32 to a second analog comparator 48 whose processing time is in the range of one microsecond and configured to compare the measured voltage with a second maximum voltage threshold above which the signal processing unit 34 estimates that it consists of an over-voltage which could be the consequence of a singular event, in particular of the disturbance event type or SEU.

To this end, according to FIG. 5, the electronic spatial system 10 includes a third protective switch 52, of a type similar to the first protective switch 24, controlled by the protection function control means 20 of the signal processing unit 34. The third protective switch 52 is arranged between the signal output port 301 of the regulation and stabilization device 14 and the electrical ground of the system, i.e. between the regulated output supply voltage 32 of the electric power supply regulation and stabilization device 14 and the electrical ground of the electronic spatial system 10. The third protective switch 52 is configured to be switched simultaneously with the second protective switch 40 by the protection function control means 20 into an ON state, i.e. into a closed state, upon detection of an over-voltage, and also upon detection of a sub-voltage by the voltage monitoring device 50.

Indeed, an electric power supply regulation and stabilization device 14 commonly comprises different stages which could be electrically isolated from one another when the considered device is no longer powered. This is for example the case for a DC/DC type converter which operates by transfer of electrical charges between the input stage and the output stage at the rate of the chopping frequency. According to such electronic architectures, grounding the output port alone allows conducting the charges accumulated in the output stage of the considered device, but not the charges accumulated in its input stage. Conversely, grounding the signal input port allows conducting such charges accumulated in the input stage. Thus, grounding both the signal input port and the signal output port allows for a better protection of the regulation and stabilization device 14.

According to the scenario for which the electronic spatial system 10 comprises a power supply regulation and stabilization device 14 that is sensitive to spatial radiations causing singular events, and also the sensitive electronic circuit 12 electrically powered by said sensitive power supply regulation and stabilization device 14, preferably, the electronic spatial system 10 comprises the third protective switch 52 arranged the closest to the regulated output 32 of the electric power supply regulation and stabilization device 14 and the first protective switch 24 arranged the closest to the power supply rail 30 of the sensitive electronic circuit 12.

Alternatively, according to the same scenario, the electronic spatial system 10 may comprise one single protective switch instead of the first protective switch 24 and the third protective switch 52. Preferably, said single protective switch may be arranged the closest to the power supply rail 30 of the sensitive electronic circuit 12. Similarly to FIG. 1, the second embodiment of the electronic spatial system 10 includes a cut-off switch 38 arranged upstream of the regulation and stabilization device 14, i.e. in series between the main power supply input PS and the regulation and stabilization device 14 of the electric power supply. Similarly to the embodiment of FIG. 1, the cut-off switch 38 is controlled to open within a few microseconds prior to close the protective switch(es), said protective switches being switched into the closed state within a time period in the range of ten microseconds.

In general and according to FIG. 1 and FIG. 5, the electronic spatial system 10 may therefore comprise at least one first protective switch 24, 40 configured for the electrical grounding of the signal input port of an electronic circuit that is sensitive to spatial radiations, said first protective switch 24, 40 being controlled to close upon detection of an amplitude of the signal representative of the amount of spatial radiations greater than a predefined radiation threshold. The electronic spatial system 10 may also comprise at least one cut-off switch 22 arranged electrically in parallel with the at least one protective switch 24, 40, the at least one cut-off switch 22 being configured to turn off the sensitive electronic circuit in a so-called soft manner, i.e. according to a switching operation into the closed state generating no electrical stress on the sensitive electronic circuit.

In general and according to FIG. 5, the electronic spatial system 10 may also comprise at least one second protective switch 52 configured to electrically ground the signal output port of an electronic circuit sensitive to spatial radiations, said second protective switch 52 being controlled to close upon detection of an amplitude of the signal representative of the amount of spatial radiations greater than the predefined radiation threshold.

Figure 6:
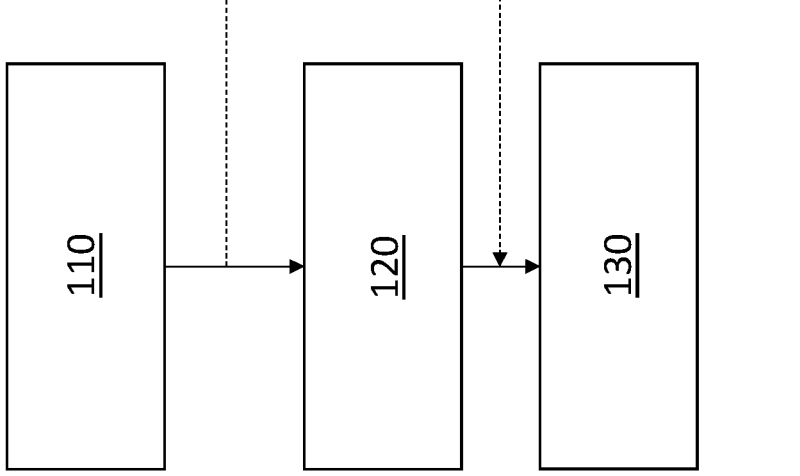
FIG. 6 is an illustration of a flowchart of a method for protecting a spatial electronic circuit sensitive to spatial radiations.

According to FIG. 6, a method 100 for protecting an electronic circuit 12 that is sensitive to spatial radiations of the electronic spatial system 10 described in FIGS. 1 to 5 is illustrated. The protection method 100 firstly comprises a step 110 of detecting an amplitude of the signal representative of the amount of spatial radiations greater than a predefined radiation threshold, such as the detection of an amplitude of the electrical power supply signal 29 of at least one electric power supply 11 of a plurality of electric power supplies of the sensitive electronic circuit outside at least one range of pre-defined amplitude values. More particularly, the step 110 of detecting an amplitude of the electrical power supply signal 29 may be a step of detecting an electric current overconsumption of the electric power supply input of at least one electric power supply regulation and stabilization device 14 out of a plurality of electric power supply regulation and stabilization devices 14. Following the detection step 110, the method comprises a step 130 of switching to the electrical ground one or more protective switches 24 of the electronic spatial system. In some embodiments, each of the protective switches 24 of the electronic spatial system is switched to the electrical ground. When several protective switches 24 are switched to ground, the switching operation may be done simultaneously or almost simultaneously. Moreover, in some embodiments, one or more cut-off switches 22 of the electronic spatial system are also switched to the electrical ground during step 130. In some embodiments, each of the cut-off switches 22 of the electronic spatial system is switched to the electrical ground during step 130. When several cut-off switches 22 are switched to ground, the switching operation may be done simultaneously or almost simultaneously. In addition, following the detection step 110, the protection method 100 may comprise a step 120 of cutting off the electric power supplies 11 of the sensitive electronic circuit.

Figure 7:
FIG. 7 is an illustration of a flowchart of a method guaranteeing the robustness to spatial radiations of the electronic protection system according to the invention.
Figure 7:
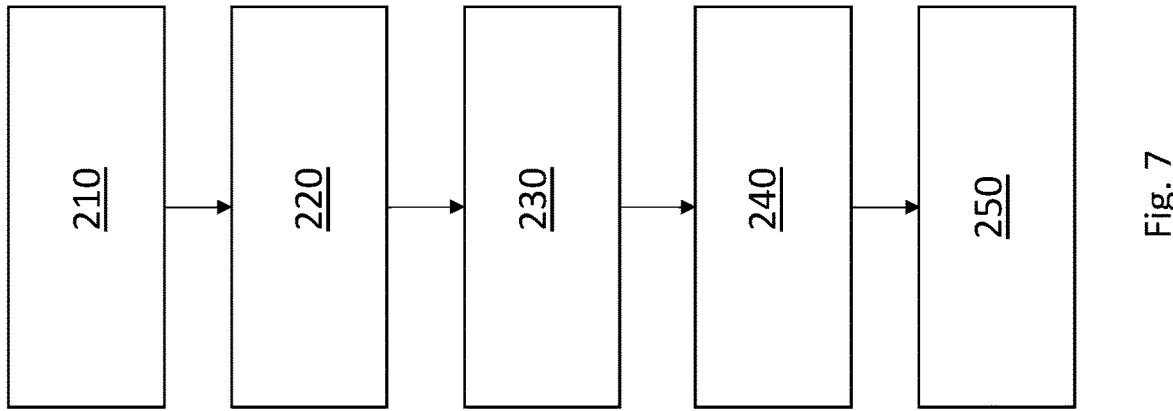

According to FIG. 7, a test method 200 ensuring a predefined service life of the electronic spatial system 10 is shown. One of the main advantages of the method of the invention is to be able to test on the ground the robustness of the electronic system 10 to spatial radiations in its intended hardware configuration on-board a satellite. More particularly, the test is even more representative of the conditions of an operational mode of the electronic spatial system 10 on-board a satellite in Earth orbit, that the test is performed according to a method wherein the sensitive component 12 is neither deprived of its protective case, nor thinned in the case of a flip chip type component commonly so-called "flip chip" according to the Anglo-Saxon term.

According to the invention, a first step consists in sending penetrating heavy ions or penetrating radiation 210 onto the sensitive electronic circuit 12. By sending penetrating heavy ions, it should be understood a sending according to which the heavy ions are introduced into the silicon layers of an electronic chip according to a depth of a few hundred μm, typically 500 μm. An example of an installation allowing generating these heavy ions is the GANIL which enables a penetration of about 600 μm in Si at 60 MeV·cm2/mg in Xe ion. In a manner comparable to an exposure of the sensitive electronic circuit 12 to the heavy ions, sending certain radiations could trigger singular events resulting in a degradation and even destruction of a sensitive electronic circuit 12 by imparting singular events thereto. This consists in particular of an X-ray radiation. This radiation type may be generated in a synchrotron, like for example the European synchrotron ESRF. The radiation level is selected so as to be just strong enough to cause singular events representative of the spatial environment and limit effects due to overexposure.

A step of the test method 200 may consist in proceeding with the acquisition 220 of the number of switching operations to the electrical ground the protective switches 24 during the sequence of sending penetrating heavy ion or penetrating radiation. More particularly, this step 210 consists in targeting different geographical areas of the sensitive electronic circuit so as to constrain different electronic blocks of the sensitive electronic circuit 12. To this end, according to the invention, each sending of the step of sending penetrating heavy ions or penetrating radiation 210 induces a switching operation of one or more protective switches 24, each of the switches could be automatically switched into an open state between each sending of the sequence 210.

In order to guarantee a predefined service life of the electronic spatial system 10 on-board a satellite in Earth orbit, for example and in a non-limiting manner, for a guaranteed service life of fifteen years, switching the protective switches 24 to the electrical ground should be triggered as many times as these switching operations could be triggered in the radiative spatial environment. To this end, the test method 200 may comprise, where necessary, a step following the sending or bombardment step, of switching 230 repeatedly and complementarily to the switching operation of the protective switches during the sending or bombardment step, up to a predefined number of switching operations to the electrical ground representative of an estimated number of switching operations the protective switches 24 to the electrical ground that could be triggered over the predefined service life of the electronic spatial system 10 in its spatial environment if the number acquired in the acquisition step 220 is not enough. In general, the predefined number of switching operations is derived from statistics estimated by modeling and return of experience of satellites evolving at different altitudes in Earth orbit, the level of spatial radiations could depend on the orbit altitude of the satellite embedding an electronic spatial system 10. For example and in a non-limiting manner, the number of switching may be in the range of a few hundred over a period of fifteen years.

Nonetheless, steps 220 and 230 are optional. Indeed, depending on the nature of the penetrating heavy ions or of the penetrating radiation implemented during step 210, targeting geographical areas of the sensitive electronic circuit 12 is more or less accurate. For example, in the case of an X-ray test, the penetrating radiation is less localized than with heavy ions. Thus, because of this diffuse nature, the penetrating radiation can affect different portions of the sensitive electronic circuit 12 or the rest of the system 10 leading to only one triggering for several singular events. Thus, with a radiation representative of the spatial environment over the estimated service life of the sensitive electronic circuit 12, the number of switching operations of a given protective switch 24 from the OFF state into the ON state may be less than what is expected in flight over the estimated service life of the considered circuit. In this case, the implementation of steps 220 and 230 is of interest. Conversely, with radiation that could be focused accurately on a given geographical area of the sensitive electronic circuit 12, like for example with heavy ions, it may be expected that the number of switching operations of a given protective switch 24 from the OFF state into the ON state is representative of what is expected in flight over the estimated service life of the component. In such cases, the implementation of steps 220 and 230 is useless.

The last step of the test method 200 comprises a step of functional tests 250 of the electronic spatial system 10 for a predetermined time period and under a thermal stress representative of an accelerated ageing equivalent to the predefined service life of the electronic spatial system 10 embedded in a satellite in Earth orbit. As a non-limiting example, repeated functional tests over twelve months under thermal stress of four-twenty-fifteen degrees at the silicon, may be representative of the operation of the electronic spatial system 10 for eight years with a junction temperature of the sensitive electronic circuit 12 of about sixty degrees Celsius with a margin of about ten percent.

In case of a functional failure of the electronic spatial system 10 being tested, the electronic spatial system 10 cannot be embedded in a satellite.

Optionally, the test method 200 may comprise, following step 230, a step 240 of determining the state of the structures of the sensitive electronic circuit 12 by imaging the sensitive electronic circuit 12 following the sending or bombardment step 210. This step allows verifying the efficiency of the protective switches 24 so that if a structural defect of an electronic block of the sensitive electronic circuit 12 was identified by imaging, then the electronic spatial system 10 cannot be embedded in a satellite.

In a non-limiting manner, the observation by imaging may consist of an observation of the visible optical type in order to identify/locate large degradations due to singular events which would be directly visible on the outer surface of the sensitive electronic circuit 12. The observation by imaging may also consist of an observation of the infrared optical type in order to identify/locate hot spots that are absent on a control component and therefore the areas concerned by a singular event and also identify/locate degradations on the metallizations of higher and lower levels by taking advantage of the fact that the silicon is transparent to infrared.

Observation by imaging may also consist of a photon type observation in order to identify/locate, after masking allowing limiting the search area complementarily with or as a replacement of infrared imaging, the areas concerned by a singular event while the latter is activated, without the problem of infrared penetration limited to the non-transparent elements, namely the metallizations and without the problem of resolution limit due to the wavelength of the optical methods. Also, observation by imaging may also consist of a scanning electron-type observation in order to perform layer-by-layer imaging of the chip with a progressive deconstruction by plasma polishing and seek to control the absence of defects in the areas previously identified during the preceding steps. The test method 200 may comprise, following step 230 or 240, a step 250 of functional tests.

The invention claimed is:

1. An electronic spatial system including:

an electronic circuit sensitive to spatial radiations comprising at least one signal input port and/or at least one signal output port;

a signal processing unit;

an electronic unit for detecting spatial radiations electrically connected to the signal processing unit;

at least one protective switch electrically connected between the electrical ground of the electronic spatial system and at least one out of the signal input or output ports of the sensitive electronic circuit, and controlled by the signal processing unit, the protective switch being configured to be switched from an OFF electrical state into an ON electrical state within a time period less than one hundred microseconds;

at least one cut-off switch electrically arranged in parallel with the at least one protective switch, and controlled by the signal processing unit, and including a bipolar transistor configured to be switched from an OFF electrical state into an ON electrical state within a time period greater than one hundred microseconds, the signal processing unit being configured to switch the at least one protective switch to the electrical ground upon detection of an amplitude of a signal representative of the amount of spatial radiations greater than a predefined radiation threshold, the signal processing unit being configured to switch the cut-off switch to the electrical ground when turning off the sensitive electronic circuit.

2. The system according to claim 1, wherein the electronic circuit sensitive to spatial radiations comprises at least one signal output port, wherein at least one amongst the protective switches is electrically connected to the signal output port.

3. The system according to claim 1, wherein the electronic circuit sensitive to spatial radiations comprises at least one signal input port and at least one signal output port, the system including:

a first protective switch electrically connected between the electrical ground of the electronic spatial system and the signal input port, a second protective switch electrically connected between the electrical ground of the electronic spatial system and the signal output port.

4. The system according to claim 1, wherein the spatial radiation detection electronic unit comprises an electronic device for monitoring the electric current of the signal input port.

5. The system according to claim 1, wherein the spatial radiation detection electronic unit comprises an electronic device for monitoring the electrical voltage of the signal output port.

6. The system according to claim 1, wherein at least one protective switch includes a field-effect transistor or a Darlington pair of two bipolar transistors.

7. The system according to claim 1, wherein at least one signal input port is an electric power supply rail of the sensitive electronic circuit.

8. A method for protecting the sensitive electronic circuit of the electronic spatial system of claim 1, the protection method comprising the steps of:

detecting an amplitude of the signal representative of the amount of spatial radiations greater than a predefined radiation threshold;

switching to the electrical ground at least one protective switch.

9. The protection method according to claim 8, the electronic spatial system including at least two protective switches, the switching step comprising switching to the electrical ground each of the at least two protective switches simultaneously.

10. A test method ensuring a predefined service life of the electronic spatial system of claim 1, the test method including the steps on the ground of:

sending penetrating heavy ions or penetrating radiation capable of creating latch-up on the sensitive electronic circuit; and functional tests of the electronic spatial system following the sending step, for a predetermined time period and under thermal stress representative of an accelerated ageing equivalent to the predefined service life of the electronic spatial system on-board a satellite in Earth orbit.

11. The method according to claim 10, further comprising the steps on the ground of:

acquiring the number of switching operations from the OFF state into the ON state of at least one protective switch during the sending step;

comparing the acquired number of switching operations with a predefined number Np of switching operations to the electrical ground representative of an estimated number of switching operations to the electrical ground that could be triggered over the predefined service life of the electronic system in its spatial environment;

if the acquired number of switching operations is less than the predefined number Np of switching operations, switching repeatedly and complementarily to the switching operations of the at least one protective switch during the sending or bombardment step, up to a predefined number of switching operations to the electrical ground representative of an estimated number of switching operations to the electrical ground that could trigger during the predefined service life of the electronic system in its spatial environment.

12. The method according to claim 10, further comprising a step of:

determining the state of the structures of the sensitive electronic circuit by imaging the sensitive electronic circuit following the sending step.

13. The protection method according to claim 8, further comprising switching at least one cut-off switch to the electrical ground.

* * * * *